(12) United States Patent
Sundholm

(10) Patent No.: US 10,689,192 B2
(45) Date of Patent: Jun. 23, 2020

(54) METHOD, APPARATUS AND SYSTEM FOR HANDLING WASTE MATERIAL

(71) Applicant: MARICAP OY, Vantaa (FI)

(72) Inventor: Göran Sundholm, Tuusula (FI)

(73) Assignee: MARICAP OY, Vantaa (FI)

( * ) Notice: Subject to any disclaimer, the term of this patent is extended or adjusted under 35 U.S.C. 154(b) by 0 days.

(21) Appl. No.: 16/067,168

(22) PCT Filed: Jan. 2, 2017

(86) PCT No.: PCT/FI2017/050001
§ 371 (c)(1),
(2) Date: Jun. 29, 2018

(87) PCT Pub. No.: WO2017/118779
PCT Pub. Date: Jul. 13, 2017

(65) Prior Publication Data
US 2019/0016532 A1     Jan. 17, 2019

(30) Foreign Application Priority Data
Jan. 7, 2016    (FI) ..................................... 20165006

(51) Int. Cl.
*B65G 53/60*      (2006.01)
*B65F 5/00*        (2006.01)
(Continued)

(52) U.S. Cl.
CPC .............. *B65F 5/005* (2013.01); *B65G 53/46* (2013.01); *B65G 53/60* (2013.01); *B65G 53/24* (2013.01)

(58) Field of Classification Search
CPC .... B65G 53/46; B65G 53/60; B65G 2205/00; B65G 2205/02; B65G 2205/04;
(Continued)

(56) References Cited

U.S. PATENT DOCUMENTS 3,853,355 A * 12/1974 Buisson ................. B65G 51/02
406/19
3,933,393 A * 1/1976 De Feudis .............. B65F 5/005
406/130
(Continued)

FOREIGN PATENT DOCUMENTS

FI           124837 B    2/2015
FR       1.540.435 A    9/1968
(Continued)

OTHER PUBLICATIONS

International Search Report (PCT/ISA/210) issued in PCT/FI2017/050001, dated Apr. 11, 2017.
(Continued)

*Primary Examiner* — Joseph A Dillon, Jr.
(74) *Attorney, Agent, or Firm* — Birch, Stewart, Kolasch & Birch, LLP

(57) ABSTRACT

Method for conveying and handling waste material in the channel section of a pneumatic wastes conveying system, in which method solid waste material or recycleable material fed into a conveying pipe is conveyed in the conveying pipe of the pneumatic pipe transport system for material along with the transporting air flow to the delivery end of the material conveying system, where the material is separated from the transporting air. In the method the material is acted upon in the conveying pipe by stopping the speed of movement of the material being conveyed in the conveying pipe by means of a stopper arranged between the separating device of the delivery end and the material being handled, or against the stopper at, or in the proximity of, the delivery end of the material conveying system and by bringing about in the channel space of the conveying pipe volumetric compression in at least a part of the material being conveyed by means of the stopper arranged between the separating device of the delivery end and the material being handled, or
(Continued)

against the stopper, by means of a pressure difference acting on the different sides of the material being handled, such as by the combined effect of suction and replacement air, before transportation of the material onwards in the conveying pipe into a container of the separating device arranged at the delivery end of the pneumatic transport system for wastes.

23 Claims, 4 Drawing Sheets

(51) Int. Cl.
*B65G 53/46* (2006.01)
*B65G 53/24* (2006.01)

(58) Field of Classification Search
CPC .... B65G 53/28; B05G 5/005; B05G 2210/12; B65F 5/005; B65F 2210/12; B65F 1/10; E04F 17/10; E04F 17/12
USPC ...... 406/83, 192, 197, 168; 100/144; 53/439
See application file for complete search history.

(56) References Cited

U.S. PATENT DOCUMENTS

| | | | | |
|---|---|---|---|---|
| 3,948,167 | A | | 4/1976 | De Feudis |
| 4,036,531 | A | * | 7/1977 | Rusterholz ........... B65G 53/525 406/50 |
| 4,168,864 | A | * | 9/1979 | Weeks .................. B65G 53/28 406/109 |
| 4,342,404 | A | * | 8/1982 | Baker ................... B65G 11/20 221/10 |
| 4,371,294 | A | * | 2/1983 | Sakamoto ............ B65G 53/30 137/565.33 |
| 4,373,838 | A | * | 2/1983 | Foreman ............... E03F 1/006 137/236.1 |
| 4,765,781 | A | * | 8/1988 | Wilks .................... F01K 9/003 222/136 |
| 4,987,988 | A | * | 1/1991 | Messina ............... B65F 1/0093 186/3 |
| 4,993,882 | A | * | 2/1991 | Nishizuka ............. B65F 5/005 406/117 |
| 4,995,765 | A | * | 2/1991 | Tokuhiro .............. B65F 5/005 209/580 |
| 5,071,289 | A | * | 12/1991 | Spivak ................. B65D 88/70 406/11 |
| 6,447,215 | B1 | * | 9/2002 | Wellmar ............... B65G 53/66 406/11 |
| 9,896,265 | B2 | * | 2/2018 | Sundholm ............. B65F 5/005 |
| 10,399,799 | B2 | * | 9/2019 | Sundholm |
| 2007/0274789 | A1 | * | 11/2007 | DeBruin ............... B01D 9/0027 406/197 |
| 2013/0220893 | A1 | * | 8/2013 | Sukkar ................. B03B 9/06 209/147 |
| 2014/0328633 | A1 | * | 11/2014 | Nierescher ........... B65G 53/14 406/19 |
| 2015/0375935 | A1 | * | 12/2015 | Sundholm ............. B65F 5/005 406/151 |
| 2016/0145042 | A1 | * | 5/2016 | Sundholm ............. B65G 53/46 100/41 |
| 2017/0225910 | A1 | * | 8/2017 | Sundholm ............. B65F 5/005 |
| 2018/0237219 | A1 | * | 8/2018 | Sundholm ............. B65F 5/005 |
| 2019/0255794 | A1 | * | 8/2019 | Bishop ................. B03B 9/061 |

FOREIGN PATENT DOCUMENTS

| | | |
|---|---|---|
| WO | WO 2013/011281 A2 | 1/2013 |
| WO | WO 2013/038057 A1 | 3/2013 |
| WO | WO 2014/135746 A1 | 9/2014 |
| WO | WO 2015/015054 A1 | 2/2015 |
| WO | WO 2015/140403 A1 | 9/2015 |

OTHER PUBLICATIONS

Written Opinion (PCT/ISA/237) issued in PCT/FI2017/050001, dated Apr. 11, 2017.
Extended European Search Report, dated Aug. 12, 2019, for European Application No. 17735886.8.

* cited by examiner

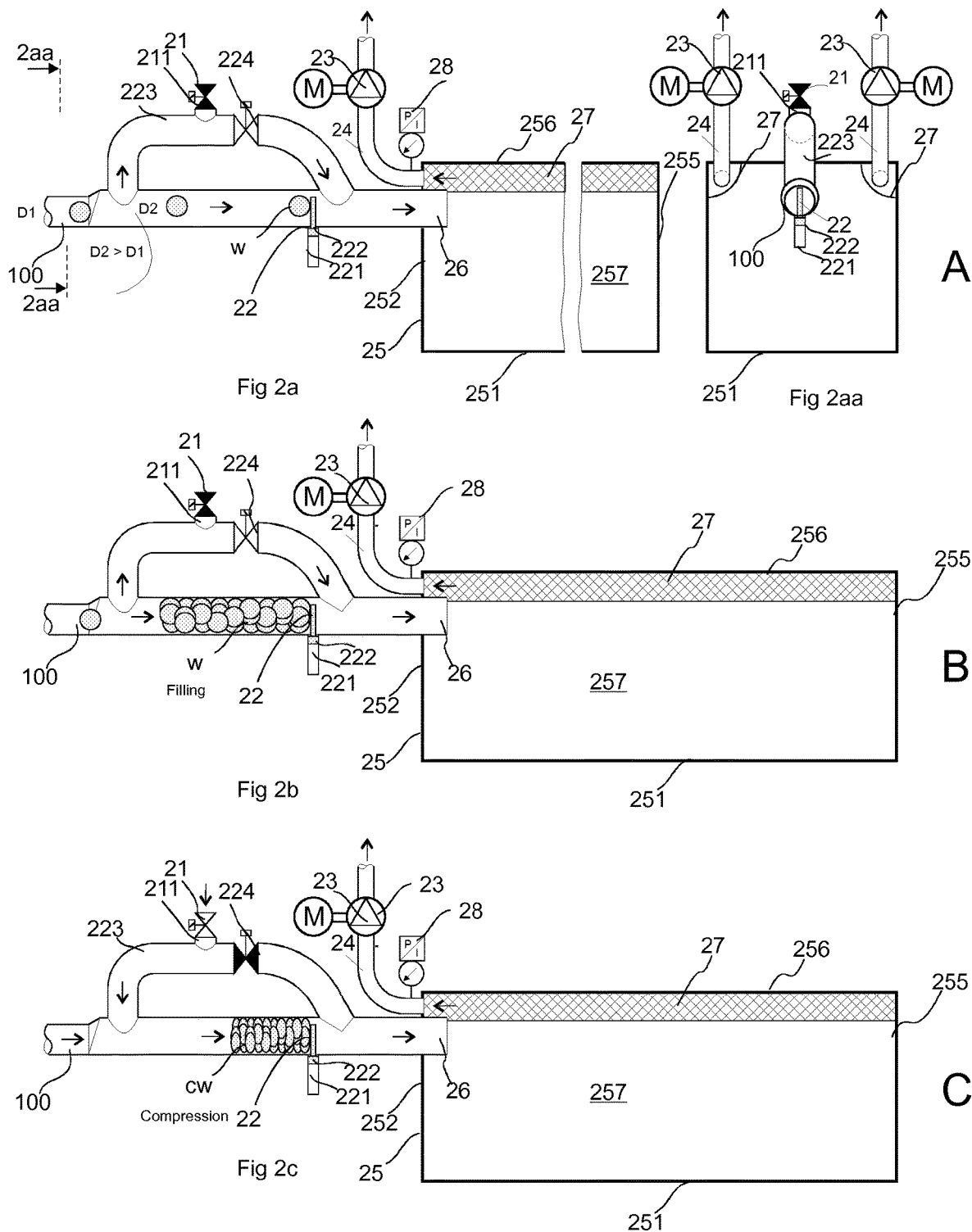

METHOD, APPARATUS AND SYSTEM FOR HANDLING WASTE MATERIAL

FIELD OF THE INVENTION

The invention relates generally to material conveying systems, such as to pneumatic partial-vacuum transporting systems, more particularly to the collection and conveying of wastes, such as to the conveying of household wastes.

BACKGROUND OF THE INVENTION

Such systems are presented in publications WO 2009/080880, WO 2009/080881, WO 2009/080882, WO 2009/080883, WO 2009/080884, WO 2009/080885, WO 2009/080886, WO 2009/080887 and WO 2009/080888, among others. The invention relates to the delivery end of waste conveying systems, more particularly to the apparatuses of waste stations, in which apparatuses the waste material of pneumatic systems is conveyed from a conveying pipe into a waste container.

Systems wherein solid wastes are conveyed in a piping system by means of a pressure difference or suction are known in the art. In these, wastes are conveyed long distances in the piping system by sucking. It is typical to these systems that a partial-vacuum apparatus is used to bring about a pressure difference, in which apparatus negative pressure is brought about in the conveying pipe with partial-vacuum generators, such as with a fan, with vacuum pumps or with an ejector apparatus. A conveying pipe typically comprises at least one valve means, by opening and closing which the replacement air coming into the conveying pipe is regulated. Waste input points, e.g. rubbish bins or refuse chutes, are used in the systems at the input end for waste material, into which input points material, such as waste material, is fed and from which the material being conveyed is transferred into a conveying pipe by opening a discharge valve, in which case, by means of the suction effect achieved by the aid of the partial vacuum acting in the conveying pipe, and also by means of the surrounding air pressure acting via the replacement air valve of an input point and/or arranged in the conveying pipe, solid material, such as e.g. solid waste material packed into bags, is conveyed from an input point into the conveying pipe and onwards in the conveying pipe to a reception point, in which the material being transported is separated from the transporting air and e.g. in a separating device, which can also be a waste container, such as a horizontal separator container. The pneumatic conveying systems for solid wastes in question can be utilized particularly well in densely populated urban areas. These types of areas have tall buildings, in which the feeding in of wastes into a pneumatic conveying system for wastes is performed via an input point, such as a refuse chute arranged, in the building.

The volume of the container at the reception point typically varies according to the embodiment. Typically the volume of a waste container of a reception point can be e.g. 10-60 m$^3$. Depending on the application site, the conveying system is used to convey the material that has accumulated in the input points e.g. 1-3 times in a 24-hour cycle. Conventionally, it has been endeavored to raise the capacity of a waste container by compacting the waste into a more concentrated form in the container by means of a compressor device, the compressor means of which compresses the material into a denser form before conveying it into the container or in conjunction with conveying it into the container. A compressor device requires a lot of space and typically requires a separate separating device, from which waste material is conveyed into the operating area of the compressor and onwards into the container for compacting. These are typically applied in particularly large systems. Also known in the art are solutions wherein waste is compacted before the actual conveying of the material in the piping system. In such a case the material is compacted immediately after the feed-in phase. Replacement air is added to the body of compacted material before it is conveyed in the conveying piping so that the material displaces in the conveying piping more reliably and the risk of blockage is reduced. In such a case the material constituents of the material batch being conveyed separate from each other and thus the volume of the material batch expands in the transporting air flow in the piping. In this case in the conveying piping a material batch that expanded in volume during transportation again takes up a lot of space in the container at the receiving end.

The aim of the present invention is to achieve an entirely new type of solution for compacting material in the reception end of a wastes conveying system, by means of which solution the drawbacks of solutions known in the art are avoided. One aim of the invention is to achieve a solution with which the capacity of a material container can be utilized more efficiently than earlier. One aim is to achieve an easily controllable arrangement that is applicable particularly to rather small systems, that is advantageous in terms of costs and that takes up little space.

BRIEF DESCRIPTION OF THE INVENTION

The invention is based on a concept wherein the volumetric compression of material conveyed in a conveying pipe is achieved in the conveying pipe in the proximity of material delivery end as a result of a sudden stopping of the conveying speed of the material when the material being transported hits against a stopper means as well as by means of a pressure difference subsequently acting on different sides of the material stopped by the stopper means. The method according to the invention is mainly characterized by what is stated in claim 1.

The method according to the invention is also characterized by what is stated in claims 2-14.

The apparatus according to the invention is mainly characterized by what is stated in claim 15.

The apparatus according to the invention is also characterized by what is stated in claims 15-24.

The system according to the invention is characterized by what is stated in claim 25.

The solution according to the invention has a number of important advantages. By means of the invention consolidation, compacting, i.e. volumetric compression, of the waste material is achieved, in which case more material than earlier fits into a container disposed at the delivery end, in the reception point for wastes. The volumetric compression can, depending on the application site, be e.g. in the region of 25-75%, depending on the type of waste or on the type of recycleable material. The volumetric compression of material is brought about as a result of a sudden stopping of the conveying speed of the material when the material being transported hits against a stopper means as well as by means of a pressure difference subsequently acting on different sides of the material stopped by the stopper means. A pressure difference can be brought about e.g. as the combined effect of replacement air and of the suction brought about by a partial-vacuum generator of the pneumatic conveying system for wastes when the material is compressed against the stopper means. Alternatively, or additionally, overpressure can be brought about on the opposite side of the material with respect to the stopper means, in which case the material can be compressed more effectively and can be efficiently conveyed after the compression phase into the separator means/container. The stopper means can be a means arranged in the conveying pipe before the separator means, through which means, or around the sides of which means, an air flow is able to travel, but against which means at least most of the material being conveyed remains in the conveying pipe. The stopper means acts on the material by bringing about a support effect in it, which thus mainly prevents, to at least a significant extent, the material from passing past or through the stopper means. With the solution according to the invention, material conveyed in conveying piping can be volumetrically compressed by means of a stopper means and an air flow. By arranging a separate replacement air duct in connection with the compacting arrangement, and by arranging a replacement air valve in said duct, effective compacting of the material being handled can be ensured. The entry of replacement air can be regulated e.g. also with a replacement air valve arranged in the container part of an input point and/or with a separate replacement air valve arranged in the conveying pipe. The replacement air duct of the compacting arrangement can also be used in one embodiment for bringing about overpressure in the conveying pipe/compacting chamber on the opposite side of the material with respect to the stopper means. According to the invention, input points, which are the input points of waste, such as waste receptacles or refuse chutes, can be used for feeding in material. An amount of material to be handled equivalent to the volume of the feed-in container of at least one input point is adapted to fit into the compacting chamber of the material compacting apparatus according to the invention. By arranging a bypass channel for transporting air in the conveying pipe in the proximity of the stopper means of the compacting arrangement, the bypass of air flow in the conveying pipe past the material batch that has accumulated against the stopper means can be ensured in the material conveying phase preceding the compacting phase. By arranging an expansion, i.e. an enlargement of diameter of the cross-sectional area of the material conveying channel from a first value to a second value, before the stopper means of the compacting arrangement, the speed of the transporting air can be reduced. The method and apparatus according to the invention are particularly well suited in connection with conveying systems of waste material, such as of solid waste material arranged in bags.

BRIEF DESCRIPTION OF THE FIGURES

In the following, the invention will be described in more detail by the aid of an embodiment with reference to the attached drawings, wherein FIG. 1 diagrammatically presents an embodiment of the solution according to the invention, FIG. 2a presents a simplified view of a cross-sectioned apparatus according to an embodiment of the invention, in a first operating state, FIG. 2aa presents a cross-sectioned detail of an apparatus according to an embodiment of the invention, when sectioned along the line 2aa-2aa of FIG. 2a, FIG. 2b presents a simplified view of a cross-sectioned apparatus according to an embodiment of the invention, in a second operating state, FIG. 2c presents a simplified view of a cross-sectioned apparatus according to an embodiment of the invention, in a third operating state.

DETAILED DESCRIPTION OF THE INVENTION

Figure 1:
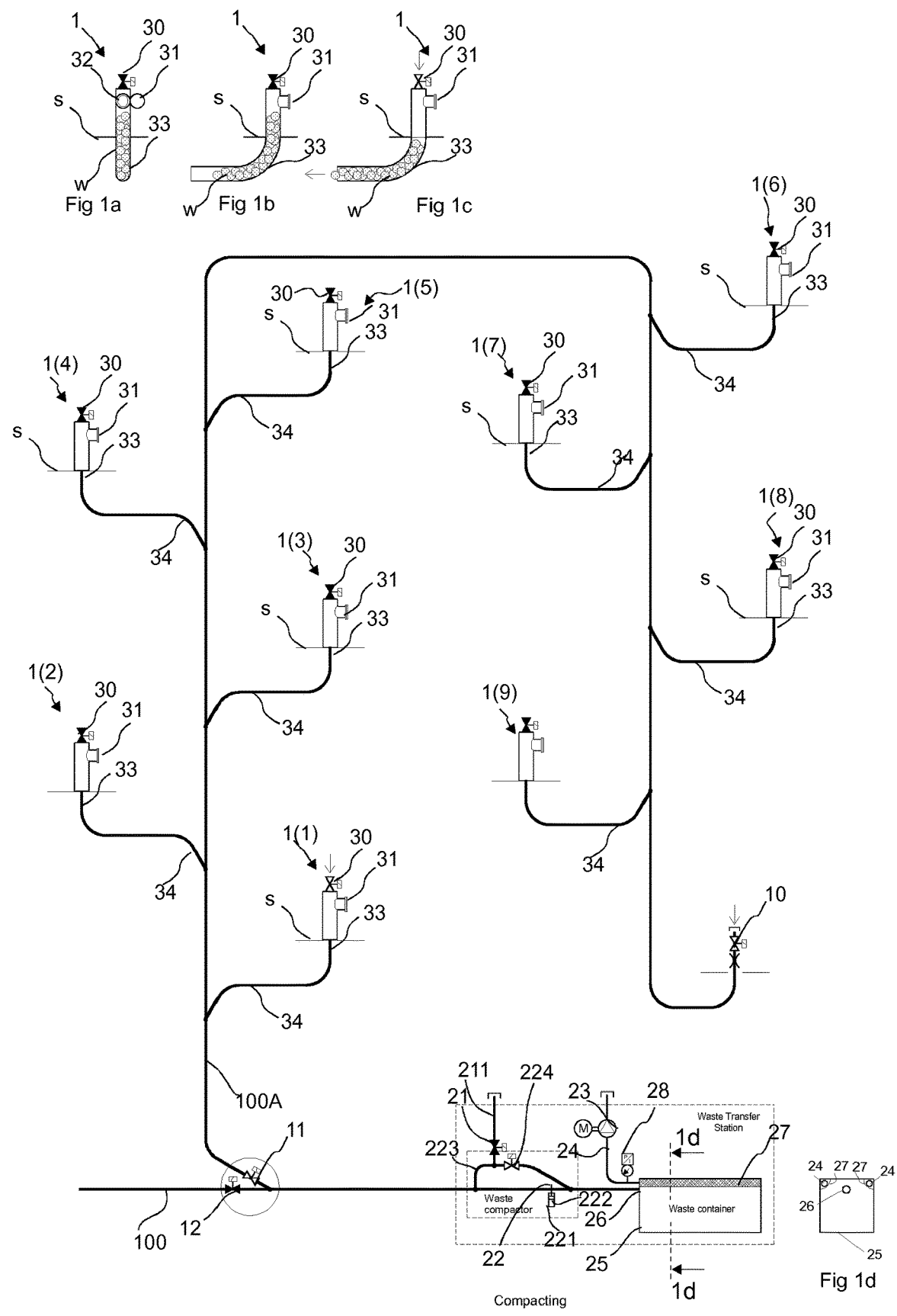
FIG. 1a presents a simplified view from a first direction of a cross-sectioned input point of the system.
FIG. 1b presents a simplified view from a second direction of a cross-sectioned input point of the system.
FIG. 1c presents a simplified view of a cross-sectioned input point of the system, in a second operating state.
FIG. 1d presents a simplified view of a separating device/container of the delivery end of the system, when the separating device/container is cross-sectioned along the line Id-Id of FIG. 1.

FIG. 1 presents a pneumatic material conveying system applying the method and apparatus of the invention. The material conveying system of the figure is e.g. a pneumatic conveying system for solid wastes. In systems of the type in question the material w is conveyed by means of a pressure difference in a transporting air flow from an input point 1 in the piping system to a delivery station, where the material w being transported and the transporting air are separated from each other in a separating device 25. The pressure difference is brought about with means for achieving a pressure difference. In FIG. 1 the means comprise at least one partial-vacuum generator 23, e.g. a vacuum pump or fan, the suction side of which is connected via a channel 24 to the container 257 of the separating device 25 and onwards into the material conveying pipe piping 100. The separating device 25 can be a container, such as a shipping container, in which the material conveyed is transported for further processing or for storage. According to one embodiment the container 25 is a horizontal separator container. A pressure difference and/or transporting air flow is brought about in the piping system 100 when a pathway is opened for replacement air to reach the piping system. For this purpose valve means 30, 10 are arranged in the piping of the conveying system, e.g. in the input points 1 and/or in the piping system 100, 100A, for conducting replacement air into the conveying piping and for bringing about a pressure difference and/or transporting air flow. The conveying system comprises a plurality of input points 1 having an input aperture 32, which can be closed with a shut-off means 31, such as a hatch. From the input aperture 32 material w is fed into the feed-in container 33 of the input point, e.g. by means of gravity. In FIGS. 1a-1c, the input aperture 32 of an input point and some of the structures of the input point 1 extend to above mounting surface s, such as above the floor surface or ground surface. A part of the feed-in container 33 extends to below the mounting surface s, such as underground, where typically also at least some of the conveying piping 100, 100A is also arranged. In the embodiment of the figure the piping of the conveying system comprises a main conveying pipe 100, to which a plurality of branch conveying pipes 100A are connectable. FIG. 1 presents a part of the main conveying pipe 100 and one branch conveying pipe 100A connectable to it.

Each input point 1 is connected to the conveying piping, in FIG. 1 to a branch conveying pipe 100A, via an input pipe 34. In the embodiment of FIG. 1, in the branch conveying pipe 100A are nine input points 1(1) . . . 1(9), in each of which is a feed-in container 33. According to another embodiment an input point 1 can comprise a number of feed-in containers in parallel, e.g. for feeding in different types of material or for different fractions of waste. According to one embodiment, the number enclosed in parentheses of the reference number 1(1) . . . 1(9) of an input point describes the emptying sequence of the input point. In this case the input point 1(1) is emptied first, the input point 1(2) second, et cetera. The input point 1(9) is emptied ninth, i.e. in the embodiment of FIG. 1 last.

Each input point 1 has a valve means 30 for feeding replacement air into the feed-in container 33 of the input point and onwards into the input pipe 34 and material conveying piping system. In the diagrammatic presentation of FIG. 1, the valve means 30 is shown in the input point on the opposite side of the material input aperture 32 with respect to the feed-in container 33. In the figure the valve means 30 is in the top part of the input point 1, while the feed-in container 33 extends downwards from the input aperture with respect to the input aperture 32. Material w fed into the feed-in container 33 and intended for conveying is therefore situated between the conveying piping and the valve means 30.

In the embodiment of FIG. 1, a valve means 10 is arranged in the opposite end of the branch conveying pipe 100A with respect to the input pipe, for conducting replacement air in a regulated manner into the branch conveying pipe 100A.

The connection from the branch conveying pipe 100A to the main conveying pipe 100 is openable and closable by means of an area valve means 11. In FIG. 1 a second valve means 12 is arranged in the main conveying pipe 100, on the side of the main conveying pipe that is away from the separating means 25 with respect to the branch conveying pipe 100A.

In the figures the valve means with an open pathway are shown as white in the diagrams and a valve means with a closed pathway is shown as black in the diagrams.

A valve 30 of an input point 1 is provided with drive means for driving the valves in a regulated manner, i.e. for driving them between at least two positions, between an open position and a closed position. According to one embodiment the drive means of a valve means 30 are adapted to react to a control pulse and to release the valve from the closed position into the open position. According to one embodiment the valve means 30 displaces from a first position, a closed position, into a second position, an open position, as a consequence of the suction/pressure difference brought about in the piping system by a partial-vacuum generator 23 of the pneumatic material conveying system. In such a case the pressure difference acting over the shut-off means of the valve 30 gets the shut-off means to displace into the second position. According to one embodiment the valve means 30 is provided with a return means, i.e. a prestressing means, such as a spring means, which displaces the shut-off means of the valve from the second position into the first position when the pressure difference over the shut-off means decreases and/or when the partial vacuum in the conveying pipe decreases to a set value.

According to one embodiment the calculated size of the aperture of the replacement air duct of a valve 30 of an input point 1 is restricted, i.e. it is smaller than the calculated size of the replacement air duct of the valve 10 at the end of the conveying piping system.

In the system of the embodiment of the invention a separating device 25 is arranged at the delivery end, such as in a waste station, the separating device comprising a container, into which the material w being conveyed is conducted from the conveying piping 100 along with the transporting air. The transporting air is conducted out of the container and the material w remains in the container. The separating device is presented as a simplified cross-section in FIGS. 1, 1d, 2a-2g.

The capacity of the container functioning as a separating device 25 arranged in the delivery end of the conveying piping of the pneumatic material conveying system is limited and in order to utilize it maximally a material compacting apparatus 21, 22 is arranged in the conveying pipe 100 near the delivery end and near the container functioning as a separating device. The material compacting apparatus comprises a stopper means 22 arranged in the conveying pipe 100 near the delivery end, which stopper means is arrangeable with a drive device 221, 222 of the stopper means in the channel space of the conveying pipe 100 in such a way that most of the material w being conveyed stops in the conveying pipe from the effect of the stopper means 22, but the transporting air flow is able to flow past the stopper means 22 or through it. The material w being conveyed stops and compacts against the stopper means 22 and the material constituents against each other. The stopper means 22 is, in the embodiment of FIG. 1, movable with drive means 221, 222 between at least two positions. Typically the stopper means 22 is movable between a first position, in which the stopper means 22 extends into the channel space of the conveying pipe 100, and a second position, in which the stopper means 22 does not essentially extend into the channel space of the conveying pipe. The stopper means 22 is adapted to allow in the first position a replacement air flow past or through the stopper means 22 in the channel space of the conveying pipe 100, but to prevent the passage of at least most of the material w intended for conveying past or through the stopper means 22 towards the separating device 25 in the first position of the stopper means. In FIG. 1 a bypass channel 223 is arranged from the conveying pipe 100 from the first side of the stopper means 22 to second side of the stopper means 22. The first end of the bypass channel 223 connects to the conveying pipe 100 before the stopper means 22 in the conveying direction of the material, at a distance from the stopper means. The second end of the bypass channel 223 connects to the material conveying pipe at a distance from the stopper means, after the stopper means in the material conveying direction. A valve means 224 is arranged in the bypass channel 223, for opening and closing the connection via the bypass channel. The operation of the compacter apparatus and the bypass channel presented in connection with it are also presented in FIGS. 2a-2g.

The compacting apparatus further comprises a replacement air duct 211, in which is arranged a replacement air valve 21. In the embodiment of FIG. 1 the replacement air duct is arranged to connect to the conveying pipe directly or via the bypass channel 223. In the embodiment of FIG. 1, the replacement air duct 221 is arranged to connect to the conveying pipe before the stopper means 22. In the embodiment of FIG. 1, the replacement air duct 221 is arranged to connect to the conveying pipe at a distance from the stopper means 22. In the figure, the replacement air duct 221 is arranged in the bypass channel before the valve means 224 in the material conveying direction.

When the desired amount of material w being conveyed has been compacted, the stopper means 22 is displaced with the drive device 221, 222 into the second position, in which the stopper means 22 no longer essentially extends into the channel space of the conveying pipe 100, in which case the compacted material batch cw displaces in the transporting air flow into the container 25 functioning as a separating device. The compacting arrangement can also comprise, as in the embodiment of FIG. 1, a replacement air duct 211 arranged in the material conveying channel before the stopper means 22 in the conveying direction of the material, in which replacement air duct a replacement air valve 21 is arranged. The drive device of the stopper means is e.g. a cylinder-piston aggregate producing a reciprocal linear movement, such as a hydraulic cylinder 221, in which the moving cylinder 222 is adapted to move the stopper means 22. The stopper means 22 is e.g. a rod means or a fork-type means. According to another embodiment the stopper means is a plate means, the plate section of which covers a part of the cross-sectional area of the conveying pipe, or e.g. a net means.

Figure 2D:
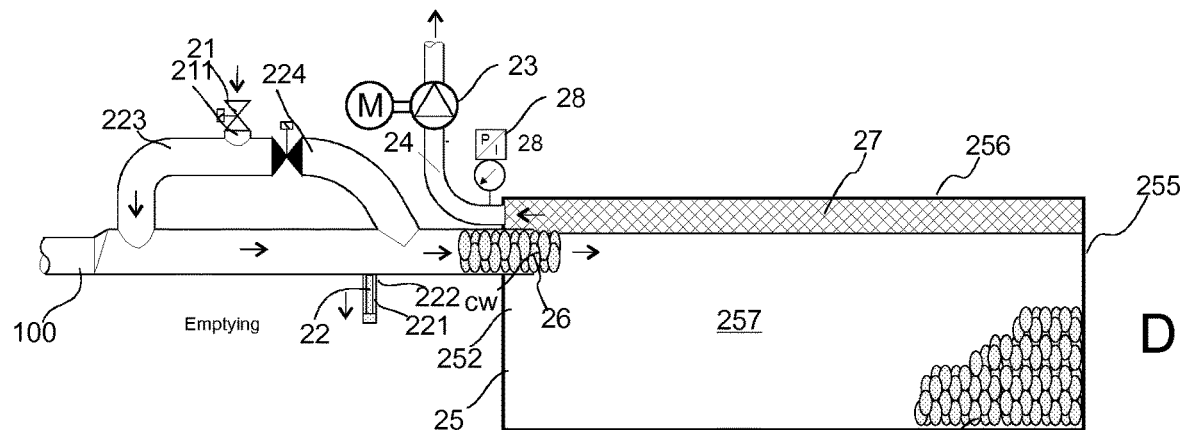
FIG. 2d presents a simplified view of a cross-sectioned apparatus according to an embodiment of the invention, in a fourth operating state.

The system in the diagram of FIG. 1 operates e.g. as follows. The vacuum pump functioning as a partial-vacuum generator 23 starts. The area valve 11 of the branch conveying pipe 100A connecting to the main conveying pipe is open. The replacement air valve 30 of the first input point 1 (1) to be emptied is open. The material w that has accumulated in the feed-in container 33 of the input point 1 (1) displaces via the input pipe 34 into the branch conveying pipe 100A. When the system comprises a replacement air valve 10 at the free end of the branch conveying pipe 100A, the valve opens. According to one embodiment the replacement air valve 10 of the branch conveying pipe 100A is arranged to open slowly to full aperture, which is larger than the flow aperture of the replacement air valve 30 of an input point. When the replacement air valve 10 has opened to full flow aperture, full flow speed into the branch conveying pipe 100A is achieved for the transporting air and the material w being conveyed displaces to near the delivery end of the conveying pipe 100, i.e. to the waste station or into the proximity of same, to the stopper means 22 arranged before the delivery end in the conveying direction of the material, which stopper means is extending in the first position into the channel space of the conveying pipe (FIGS. 2a and 2b). The material w compresses in the conveying pipe, which functions as a compacting chamber, i.e. compression chamber, against the stopper means 22, and the material constituents against each other, in which case the material compacts (FIG. 2c). The amount of material equivalent to the volume of the material container of at least one input point is adapted to fit into the pipe section that functions as a compacting chamber, i.e. as a compression chamber. The volume of the compacting chamber can be determined e.g. by the distance in the conveying pipe between the stopper means 22 and the point of connection of the replacement air duct 211 and the conveying pipe 100. The material w compacts, i.e. compresses together and against the stopper means 22, from the combined effect of the suction and replacement air flow. As a result of the compression, the volume of the waste material in the channel space of the conveying pipe decreases significantly, depending on the embodiment and on the properties of the waste material. According to one embodiment a replacement air coupling having a valve means 21 is arranged in the conveying pipe 100 in the proximity of the stopper means 22, before the stopper means in the material conveying direction. The replacement air coupling is arranged in the movement direction of the material on the opposite side of the space reserved for the material w with respect to the stopper means 22. When the valve 21 of the replacement air coupling 211 is opened, the material w compresses more against the stopper means 22, and the material constituents against each other. In this case the material w forms a compacted material batch cw (FIG. 2c). The material, such as waste material, is volumetrically compressed according to one embodiment to 50-75% of its original volume. In one case the volume of compacted waste material cw is reduced to its final volume, which is only 25-50% of its volume before compacting. When the valve 21 of the replacement air coupling of the compacting apparatus 20 is open, the partial vacuum in the branch conveying pipe 100A decreases. In this case the replacement air valve 30 of the input point 1 (1) closes. Also any replacement air valve 10 of the branch conveying pipe 100A closes. The valves 30, 10 are arranged to close, preferably automatically, when the pressure difference over the valve decreases. The system comprises at least one measuring sensor 28, which monitors the pressure, or a change in pressure or the transporting air flow in the piping system. In the embodiment of FIG. 1, the measuring sensor is arranged in the channel 24 between the suction side of the partial-vacuum generator 23 and the separating device 25. According to one embodiment the drive device 221, 222 of the stopper means 22 is controlled on the basis of the information of the measuring sensor 28. According to one embodiment the operation of the valve means 21 of the replacement air coupling of the compacting arrangement is opened on the basis of the information of the measuring sensor 28. According to one embodiment the measuring sensor 28 is a pressure sensor. According to one embodiment, when the pressure has risen on the basis of the information of the measuring sensor 28, the drive device of the stopper means 22 is controlled to displace the stopper means 22 into the second position, in which case the compacted material cw displaces into the separator means, i.e. into the container 25 (FIG. 2d) in the delivery end. After this the stopper means is returned to the first position and the valve 21 of the replacement air duct 211 is closed. Next the feed-in container of the second input point 1(2) intended for emptying of the branch conveying pipe 100A can be emptied and the corresponding phases associated with the emptying of the previous input point are implemented until all the input points 1(1) . . . 1(9) intended for emptying have been emptied. A control signal for emptying could be given for starting the emptying of the first input point 1(1). The emptying of following input points 1(2) . . . 1(9) is stepped, e.g. to start after a certain period of time after the emptying of the first input point. The control can therefore be formed to be very simple and can be implemented, according to one embodiment, e.g. by controlling the drive devices of the replacement air valves of the input points by means of a time relay. The compacting can be performed by utilizing a pressure difference also in such a way that air is brought to the opposite side of the material with respect to the stopper means, e.g. by connecting the blowing side of a vacuum pump or fan to the channel, to the opposite side of the material to be compacted with respect to the stopper means, and e.g. by connecting the suction side of a second vacuum pump or fan to the side of the stopper means with respect to the material to be compacted. In this case effective compacting of the material is achieved. If there are a number of vacuum pumps or fans in the system, they can be connected in parallel or in series or in such a way that one blows and another sucks.

The filling degree of the separating device/container 25 at the delivery end can be raised 100-150% depending on the type of material, such as on the type of waste being conveyed.

According to one embodiment each input point is emptied separately and the waste in it is in this case conveyed through to the delivery end. According to another embodiment the material in the waste conveying system is conveyed in phases, in which case in the first phase the material is conveyed from the feed-in container of an input point into the conveying piping 100, 100A and then in one or more consecutive phases the material that has been conveyed into the conveying piping is conveyed, in conjunction with the emptying of the next input points, onwards in the conveying pipe until the material reaches the delivery end. The waste conveying system is in such a case used in a pulsating manner. The advantage of using it in this manner is that more material can be conveyed per unit of time, in which case there is no need to wait in connection with the emptying of each input point for the material to displace in one cycle from the feed-in container to the delivery end.

The compacting arrangement of FIG. 1 is presented in more detail in FIGS. 2a-2g.

FIG. 2a presents in more detail an embodiment of the compacting arrangement used in FIG. 1. The figure presents the delivery end of a material conveying pipe 100, which extends to the material input aperture 26 of the container 25 functioning as a separating device. A connection is arranged to the container 25 from the suction side of the partial-vacuum generator 23 with the channel 24.

The container can be e.g. the waste container/separating device 25 presented in specification WO2014135746A, which is a combination of a collection container for material, which is formed from a container, and of means arranged in it separating the transporting air and the material being conveyed from each other. According to one embodiment the waste container/separating device 25 is a movable container/separating device, for example a so-called horizontal separator container. The conveying pipe 100 is connectable to the waste container/separating device 25, in which the material being transported is separated from the transporting air. An inlet aperture 26, into which the conveying pipe 100 can be fitted, is formed in the wall of the waste container/separating device 25, which wall is an end wall in the figure. In the figure the end of the conveying pipe 100 is fitted into the inlet aperture 26. A joint means can also be formed in the conveying pipe 100 and a counterpart, such as a collar, in the wall of the container, in the input aperture 26. The joint means and the counterpart can in this case together form a joint means, e.g. a snap-on coupling. A connection is formed in the waste container/separating device 25, to which connection a pipe or hose 24 coming from a partial-vacuum generator 23 of a partial-vacuum source can be connected with the counterpart.

In the embodiment of the figure, the partial-vacuum source of the pneumatic waste conveying system comprises a partial-vacuum generator 23, which is driven with a drive device M. The partial-vacuum generator 23 can be e.g. a vacuum pump or some other means achieving negative pressure. The suction side of the partial-vacuum generator 23 is connected to a waste container/separating device 25 via a medium pathway 24. In this case the suction/pressure difference needed in the conveying of material can be brought about in the waste container/separating device 25, in its container part, and via the input aperture 26 in the conveying piping 100, 100A. On the blowing side of the partial-vacuum generator 23 is an exhaust duct. The partial-vacuum source, the partial-vacuum generator 23 of it, can be connected from the suction side via the medium pathway 24 to the waste container/separating device 25 with a counterpart arranged in the connection 26. In the medium pathway between the partial-vacuum source and the waste container/separating device 25 there can be a valve means, with which the connection from the partial-vacuum source to the waste container/separating device can be opened and closed. FIG. 2aa presents two medium pathways 24, to which the suction side of a partial-vacuum generator is connected. There can be one or more partial-vacuum generators 23, such as vacuum pumps or fans. The partial-vacuum generators can be connected in parallel or in series.

The medium pathway 24 of the suction side of the partial-vacuum generator can also branch into a second medium pathway and is led to a connection arranged at another point in the waste container/separating device. The second medium pathway comprises a second valve means, for opening and closing the connection to the suction side of the partial-vacuum generator.

In the solution according to FIGS. 2a-2g, the waste container/separating device 25 comprises a base 251, an end wall 252, a top wall 256, side walls 253, 254 and a second end wall 255. The walls 251, 252, 253, 254, 255, 256 bound the container space 257. In the embodiment of the figure, the waste container/separating device 25 has at least one suction channel, which extends from the connection 24 into the inside space of the waste container/separating device. In the embodiment of the figure, the suction channel is arranged in the top part of the container space 257 of the waste container/separating device in the corner area, or in the proximity of the corner area, of the cross-section (FIG. 2g) orthogonal to the longitudinal direction of the container, between the top wall 256 and the side wall 253 and/or 254. In the embodiment of the figures, the waste container has two suction channels 24. Of these, the first suction channel 24 is arranged in the corner area, or in the proximity of the corner area, of the cross-section (FIG. 2g) orthogonal to the longitudinal direction of the container, between the top wall 256 and the side wall 253, and the second suction channel 24 is arranged in the corner area, or in the proximity of same, between the top wall 256 and the second side wall 254. A connection to the suction side of the partial-vacuum generator 23, i.e. suction, can be arranged from the suction pipe 24 via either the first suction channel or via the second suction channel or via both suction channels.

In the embodiment of FIGS. 2a-2g the inlet aperture 26 from the conveying pipe 100 into the waste container/separating device, into the container space 257 of it, is arranged between the first suction channel and the second suction channel.

At least one suction aperture is arranged in the suction channel 24, in the section extending into the container space 257, along the length of it. There can be a number of suction apertures along the length of the suction channel and possibly also arranged on the rim of the wall of the suction channel. A wall part 27, such as dense netting, that allows air to pass through is also arranged in the container space 257, which wall part allows air through but prevents the passage of at least large-sized particles of waste material from the suction apertures of the suction channel. The wall part 27 that allows air to pass through and the top wall 256 of the container and one of the two side walls 253, 254 form the longitudinal chamber space of the container, into which chamber space the suction channel is arranged. When the suction side of the partial-vacuum generator 23 is connected to act via the first medium channel 24 and via the connection in the first suction channel, the suction acts via the suction apertures of the first suction channel, and through the wall that allows air to pass, into the container space 257 of the waste container/separating device and onwards via the inlet aperture into the conveying piping 100, 100A. The material to be fed into the container space 257 from the inlet aperture 26 is guided in the container space to the side where the suction is acting. In this case, the bags containing material, such as waste material, that are being conducted into the container are guided in the container space 257 from the conveying pipe from the direction of the inlet aperture 26 essentially to the first suction channel side of the container space. According to one embodiment the container space starts to fill from the opposite end of the container space 257 with respect to the inlet aperture 26.

The apparatus comprises means, in the manner presented in the preceding, for conducting replacement air into the conveying piping.

In the situation of FIG. 2a the stopper means 22 is arranged with a drive device to extend into the chamber space of the conveying pipe 100. The partial-vacuum generator has started. Material is conducted from the input point 1 towards the stopper means 22 of the compacting chamber, where most of the material w stops, when the transporting air is allowed to flow past or through the stopper means 22. The material w compacts to at least some extent against the stopper means 22 and the material constituents against each other. Compacting can possibly be made more effective by arranging a special replacement air coupling into connection with the compacting arrangement, the replacement air coupling being provided with a valve means 21.

In FIGS. 2a-2f the diameter D2 of the compacting chamber of the compacting arrangement connected to the conveying pipe is arranged to be larger than the diameter D1 of the conveying pipe 100 before the compacting chamber. According to one embodiment, the compacting chamber refers to that section in the material conveying pipe that is before the stopper means 22, in the material conveying direction, in the delivery end of the material, and that is adapted to receive the amount of material w equivalent to the feed-in container of at least one input point. According to one embodiment there is a bypass channel 223 in connection with the compacting arrangement.

The start end of the bypass channel 223, the first end, which is before the stopper means 22, is arranged according to the figure in the section of conveying pipe 100 having a diameter D2 larger than the diameter D1 of the conveying pipe before, in the conveying direction of the material, the point of connection of the bypass channel 223 and the conveying pipe 100. This reduces the speed of the transporting air flow. In such a case only a very little amount of material, mainly lightweight material, gets into the bypass channel 223 while most of the material displaces in the conveying pipe directly into the compacting chamber.

In the situation of FIGS. 2a and 2b, the valve 224 of the bypass channel 223 is open, in which case some of the air flow is able to pass by the material w stopped by the stopper means 22.

FIG. 2c presents the material compacting phase. In this case the valve 224 of the bypass channel 223 is in the closed position, shutting off the passage of transporting air past the material that has accumulated against the stopper means. The partial-vacuum generator or partial-vacuum generators 23 suck a partial vacuum in the container space, which partial vacuum acts from the container space into the conveying pipe into the material that has accumulated against the stopper means 22 from the side of the container. A replacement air pathway into the conveying pipe via the channel 211 is opened by opening the replacement air valve 21 from the opposite side of the material that has accumulated against the stopper means. Replacement air typically also comes from elsewhere in the conveying piping, e.g. via a replacement air valve of an input point or some other replacement air valve. In such a case the material compacts in the compacting chamber against the stopper means 22 and the material constituents against each other. The waste material typically compresses to about 50-75% of its original volume.

Figure 2E:
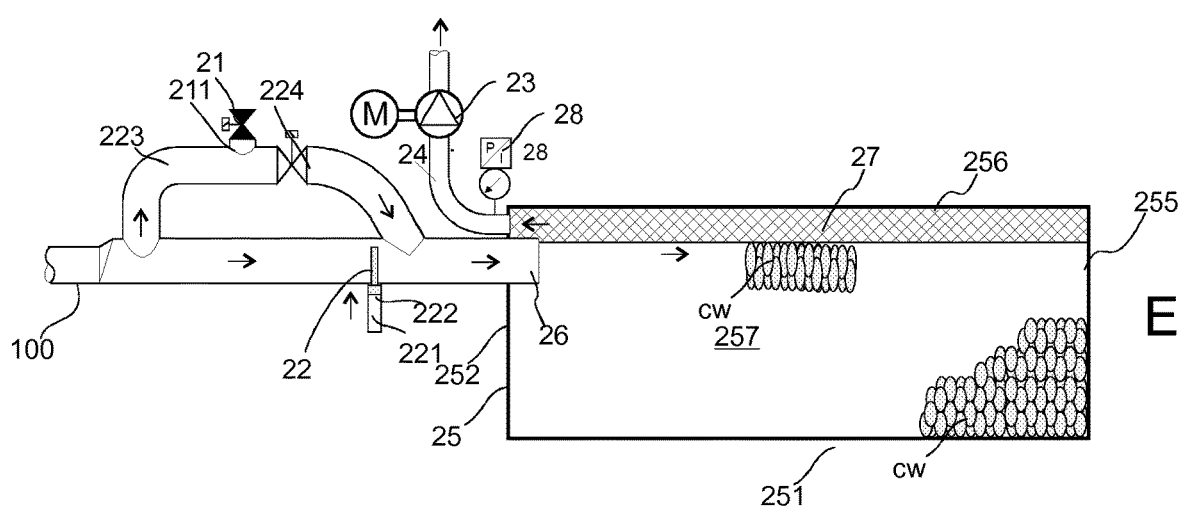
FIG. 2e presents a simplified view of a cross-sectioned apparatus according to an embodiment of the invention, in a fifth operating state.

After this, according to FIG. 2e, the stopper means is displaced into the second position, in which case the compacted waste batch cw is able to displace along with the transporting air into the container space 257 of the container 25.

The replacement air valve 21 is closed (FIG. 2e) and the stopper means 22 is displaced into the first position, in which case the material stops against the stopper means. The valve 224 of the bypass channel 223 is opened, in which case the air flow travels partly also via the bypass channel. The arrows in FIGS. 2a-2f describe the movement of the transporting air flow.

Figure 2F:
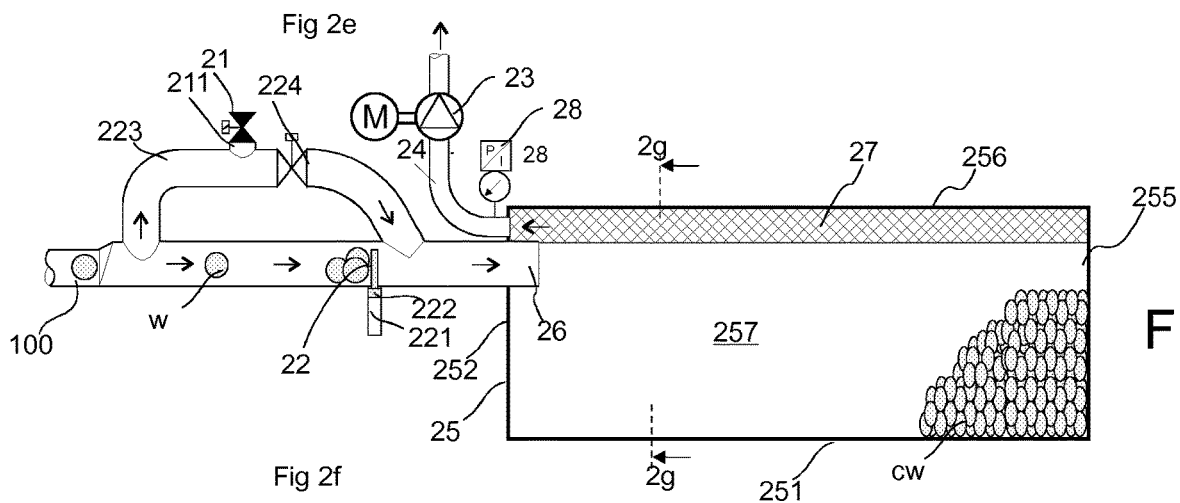
FIG. 2f presents a simplified view of a cross-sectioned apparatus according to an embodiment of the invention, in a sixth operating state.
Figure 2G:
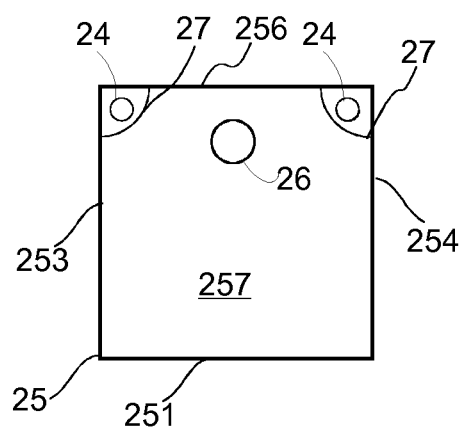
FIG. 2g presents a simplified cross-section of a container of an embodiment of the invention, without the other components of the material conveying system, sectioned along the line 2g-2g of FIG. 2f.

According to FIG. 2f, loading of the next batch of material into the compacting chamber, stopped by the stopper means 22, starts once again.

The invention thus relates to a method for conveying and handling waste material in a channel section of a pneumatic wastes conveying system, in which method solid waste material or recycleable material fed into a conveying pipe 100 is conveyed in the conveying pipe 100 of the pneumatic pipe transport system for material along with the transporting air flow to the delivery end of the material conveying system, where the material is separated from the transporting air. In the method the material w is acted upon in the conveying pipe 100 by stopping the speed of movement of the material being conveyed in the conveying pipe by means of a stopper means 22 arranged between the separating device 25 of the delivery end and the material w being handled, or against the stopper means at, or in the proximity of, the delivery end of the material conveying system and by bringing about volumetric compression in the channel space of the conveying pipe 100 in at least a part of the material w being conveyed by means of a stopper means 22 arranged between the separating device 25 of the delivery end and the material w being handled, or against the stopper means, by means of a pressure difference acting on the different sides of the material being handled, such as by the combined effect of suction and replacement air, before transportation of the material onwards in the conveying pipe into a container 257 of the separating device 25 arranged at the delivery end of the pneumatic transport system for wastes.

According to one embodiment in the method at least a part of the material w conveyed into the channel section of the conveying pipe 100 is acted upon by connecting the suction side of the pneumatic partial-vacuum generator 23 from the direction of the delivery end of the conveying pipe 100 and by opening a pathway for replacement air from the opposite side of the material w.

According to one embodiment the material w is acted upon in the channel section of the conveying pipe 100 for material, which channel section is in the proximity of the separating device 25 arranged in the delivery end of the material conveying system.

According to one embodiment the material w is conveyed from one or more input points in the conveying pipe 100 into the proximity of the stopper means 22 and the material is acted upon in the conveying pipe 100 against the stopper means 22 arranged in the proximity of the delivery end by means of a pressure difference, such as by the combined effect of suction and replacement air, in which case the material compacts, and the stopper means 22 is acted upon by displacing it into the second position, in which case it does not essentially extend into the channel part of the conveying pipe, in such a way that in the material compacting arrangement the material w and/or compressed material cw that is in the conveying pipe 100 is displaced from the channel section of the conveying pipe 100 into the container space 257 of the separating device 25 by the combined effect of suction and replacement air.

According to one embodiment the compacted material cw is displaced from the conveying pipe 100 into the container space 257 of the separating means in a controlled manner by acting with an air flow upon the material in the container space 257 of the separating means 25.

According to one embodiment when compressing material w the entry of replacement air is allowed into the proximity of the compacting arrangement, e.g. by opening the replacement air valve 21.

According to one embodiment the inlet of replacement air is regulated on the basis of pressure.

According to one embodiment the drive device 221, 222 of the stopper means 22 is controlled on the basis of pressure, under the control of a measuring sensor 28, such as a pressure sensor.

According to one embodiment the material w is compressed by 25-75%.

According to one embodiment a replacement air duct 211 is arranged in the compacting apparatus, in which replacement air duct is a replacement air valve 21, and which replacement air duct is arranged to connect to the conveying pipe at a distance from the stopper means 22 before the stopper means in the conveying direction of the material.

According to one embodiment the stopper means 22 is a separate means, which can be moved between at least two positions, a first position, in which the stopper means 22 extends into the channel space of the conveying pipe 100, and a second position, in which the stopper means does not essentially extend into the channel space of the conveying pipe, and through or past which stopper means 22 the replacement air flow passes.

According to one embodiment the speed of the transporting air flow is reduced before the stopper means 22 by expanding the diameter of the channel of the conveying pipe in the conveying direction from a first diameter D1 to a second larger diameter D2.

According to one embodiment a pathway for at least a part of the air flow to bypass the stopper means is arranged by arranging a bypass channel 223, which starts in the conveying pipe at a distance from the stopper means 22 before the stopper means in the material conveying direction and connects to the conveying pipe after the stopper means.

According to one embodiment a pressure difference is brought about by connecting a pressure source, such as the blowing side of a fan, to the conveying pipe 100 on the opposite side of the material w to be volumetrically compressed with respect to the stopper means 22, e.g. in the replacement air duct 211.

The invention also relates to an apparatus for conveying and handling waste material in the channel section of a pneumatic wastes conveying system, which apparatus comprises a material conveying pipe 100, in the channel part of which the material is adapted to be conveyed to the delivery end of the pneumatic wastes conveying system, where the material is separated from the transporting air, which apparatus comprises a partial-vacuum generator 23, the suction side of which can be connected to act in the conveying pipe 100, and means for conducting replacement air in a regulated manner into the conveying pipe. The apparatus comprises at least one stopper means 22, which is arrangeable in the channel section of the conveying pipe 100 between the delivery end of the conveying pipe and the material batch w being handled, which stopper means 22 is adapted to stop at least most of the material w and to let an air flow past or through in such a way that in the conveying pipe volumetric compression is achievable for at least a part of the material w, by means of the stopper means 22 or against the stopper means, by the combined effect of a pressure difference, such as suction and replacement air.

According to one embodiment the stopper means 22 is a separate means, which can be moved between at least two positions, a first position, in which the stopper means 22 extends into the channel space of the conveying pipe 100, and a second position, in which the stopper means does not essentially extend into the channel space of the conveying pipe, and through or past which stopper means 22 the replacement air flow passes.

According to one embodiment a replacement air valve 30 is arranged in an input point 1 for opening and closing the pathway of the replacement air into the feed-in container 33 and/or into the conveying pipe 100A, 100.

According to one embodiment a replacement air duct 211, in which is a replacement air valve 21, is arranged in the conveying pipe in the proximity of the stopper means 22 before the stopper means in the conveying direction of the material, for opening and closing the pathway for replacement air into the conveying pipe 100.

According to one embodiment the apparatus comprises a bypass channel 223, the first end of which is arranged in the conveying pipe before the stopper means 22 and the second end after the stopper means 22 in the conveying direction of the material.

According to one embodiment a replacement air duct 211, in which is a replacement air valve 21, is arranged in the bypass channel 223.

According to one embodiment a valve means 224 is arranged in the bypass channel 223 for closing the connection between the first end and the second end of the bypass channel.

According to one embodiment a replacement air duct 211 is arranged in the bypass channel 223 before the valve means 224 of the bypass channel in the conveying direction of the material.

According to one embodiment the apparatus comprises means for reducing the speed of the transporting air flow before the stopper means 22, which means comprise a conveying pipe for expanding the diameter of the channel from a first diameter D1 to a second diameter D2 that is larger than the first diameter.

According to one embodiment the apparatus comprises means for bringing about a pressure difference, which devices comprise a pressure source, such as a fan, and means for connecting the blowing side of it to the conveying pipe 100, to the opposite side of the material w to be volumetrically compressed with respect to the stopper means 22, e.g. in the replacement air duct 211. The fan can also be a compressed air pump, the blowing side of which is connected to the conveying pipe for pressurizing it from the input side with respect to the stopper means. The pressure difference makes compression of the material against the stopper means more effective and boosts the conveying of material into the separating device/container 25 when the stopper means is displaced into the second position.

The invention also relates to a wastes conveying system comprising an apparatus according to the characteristic feature specified in the preceding. According to one embodiment the conveying system for wastes comprises an apparatus according to any of claims 15-24.

Typically the material is waste material, such as waste material arranged in bags.

It is obvious to the person skilled in the art that the invention is not limited to the embodiments presented above, but that it can be varied within the scope of the claims presented below. The characteristic features possibly presented in the description in conjunction with other characteristic features can also, if necessary, be used separately to each other.

The invention claimed is:

1. A method for conveying and handling waste material in a channel section of a pneumatic wastes conveying system, wherein the pneumatic wastes conveying system comprises a separating device provided at a delivery end of the pneumatic wastes conveying system and a conveying pipe connected to the separating device, the method comprising the steps of:
    feeding the waste material into the conveying pipe of the pneumatic pipe transport system;
    conveying the waste material along with a transporting air flow in the conveying pipe to the delivery end of the pneumatic pipe transport system;
    stopping movement of the waste material being conveyed in the conveying pipe at the delivery end by a stopper arranged between the separating device and the waste material being handled, such that the waste material stops and compacts against the stopper before reaching the separating device; and
    providing a bypass channel to allow at least a part of the transporting air to flow past the stopper into the separating device while the waste material stops and compacts against the stopper before reaching the separating device,
    wherein the bypass channel starts, at a first end thereof, in the conveying pipe at a distance from the stopper at an upstream side of the stopper, and the second end of the bypass channel connects to the conveying pipe at a downstream side of the stopper, and
    wherein the waste material compacting against the stopper before reaching the separating device is achieved by generating a pressure difference acting on difference sides of the waste material and supplying a replacement air from the bypass channel to act on the waste material which stops by the stopper.

2. The method according to claim 1, wherein at least a part of the waste material conveyed into the channel section of the conveying pipe is acted upon by connecting a suction side of the pneumatic partial-vacuum generator from a direction of the delivery end of the conveying pipe and by opening a pathway for the replacement air from the opposite side of the waste material.

3. The method according to claim 1, wherein the waste material is acted upon in the channel section of the conveying pipe, and the channel section is in a proximity of the separating device arranged in the delivery end of the material conveying system.

4. The method according to claim 1, wherein the waste material is conveyed from one or more input points in the conveying pipe into a proximity of the stopper and is acted upon in the conveying pipe against the stopper arranged in a proximity of the delivery end by means of a pressure difference such that the material compacts, and the stopper is acted upon by displacing it into a position, in which the stopper does not essentially extend into a channel part of the conveying pipe, in such a way that the waste material and/or compressed waste material that is in the conveying pipe is displaced from the channel section of the conveying pipe into a container space of the separating device by a combined effect of suction and replacement air.

5. The method according to claim 1, wherein the compacted waste material is displaced from the conveying pipe into a container space of the separating device in a controlled manner by acting with an air flow upon the waste material in the container space of the separating device.

6. The method according to claim 1, wherein when compressing material an entry of the replacement air is allowed into a proximity of the compacted waste material by opening a replacement air valve.

7. The method according to claim 1, wherein an inlet of the replacement air is regulated on the basis of pressure.

8. The method according to claim 1, wherein a drive device of the stopper is controlled on the basis of pressure, under a control of a pressure sensor.

9. The method according to claim 1, wherein the waste material is compressed by 25-75%.

10. The method according to claim 1, wherein a replacement air duct is arranged in the bypass channel and a replacement air valve is provided in the replacement air duct, and wherein the replacement air duct is arranged to connect to the conveying pipe at a distance from the stopper before the stopper in a conveying direction of the waste material.

11. The method according to claim 1, wherein the stopper is movable between at least two positions, including a first position, in which the stopper extends into a channel space of the conveying pipe, and a second position, in which the stopper does not essentially extend into the channel space of the conveying pipe, and the replacement air flow passes the stopper.

12. The method according to claim 1, wherein a speed of the transporting air flow is reduced before the stopper by expanding a diameter of a channel of the conveying pipe in a conveying direction from a first diameter to a second larger diameter.

13. The method according to claim 1, wherein a pressure difference is brought about by connecting a pressure source to the conveying pipe on an opposite side of the waste material to be volumetrically compressed with respect to the stopper.

14. An apparatus for conveying and handling waste material in a channel section of a pneumatic wastes conveying system, comprising:
    a separating device provided at a delivery end of the pneumatic wastes conveying system;
    a conveying pipe connected to the separating device configured to convey the waste material along with a transporting air flow in the conveying pipe to the delivery end of the pneumatic pipe transport system;
    a stopper arranged between the separating device and the waste material being handled and configured to stop movement of the waste material being conveyed in the conveying pipe at the delivery end such that the waste material stops and compacts against the stopper before reaching the separating device;

a bypass channel starting, at a first end thereof, in the conveying pipe at a distance from the stopper at an upstream side of the stopper, the second end of the bypass channel connecting to the conveying pipe at a downstream side of the stopper, wherein the bypass channel is configured to allow at least a part of the transporting air to flow past the stopper into the separating device, and to supply a replacement air to act on the waste material which stops by the stopper while the waste material stops and compacts against the stopper before reaching the separating device; and a partial-vacuum generator, a suction side of the partial-vacuum generator being connected to and acting in the conveying pipe, the partial-vacuum generator being configured to generate a pressure difference acting on difference sides of the waste material, wherein the apparatus is configured in such a way that the pressure difference and the replacement air cause the waste material to compact against the stopper before reaching the separating device.

15. The apparatus according to claim 14, wherein the stopper is movable between at least two positions, including a first position, in which the stopper extends into a channel space of the conveying pipe, and a second position, in which the stopper does not essentially extend into the channel space of the conveying pipe, and the replacement air flow passes the stopper.

16. The apparatus according to claim 14, further comprising a replacement air valve arranged in an input point for opening and closing a pathway of the replacement air into a feed-in container and/or into the conveying pipe.

17. The apparatus according to claim 14, further comprising a replacement air duct, in which is a replacement air valve, arranged in the conveying pipe in a proximity of the stopper before the stopper in a conveying direction of the waste material, for opening and closing a pathway for the replacement air into the conveying pipe.

18. The apparatus according to claim 17, wherein the replacement air duct is arranged in the bypass channel.

19. The apparatus according to claim 17, further comprising a valve arranged in the bypass channel for closing a connection between the first end and the second end of the bypass channel.

20. The apparatus according to claim 19, wherein the replacement air duct is arranged in the bypass channel before the valve of the bypass channel in the conveying direction of the waste material.

21. The apparatus according to claim 14, wherein a diameter of a channel of the conveying pipe is expandable from a first diameter to a second diameter that is larger than the first diameter in order to reduce a speed of the transporting air flow before the stopper.

22. The apparatus according to claim 14, further comprising a pressure source connected to the conveying pipe, at an opposite side of the waste material to be volumetrically compressed with respect to the stopper, so as to generate a pressure difference.

23. A wastes conveying system, comprising the apparatus according to claim 14.

* * * * *